(12) United States Patent
Snyder

(10) Patent No.: US 9,995,162 B2
(45) Date of Patent: Jun. 12, 2018

(54) SEAL AND CLIP-ON DAMPER SYSTEM AND DEVICE

(71) Applicant: United Technologies Corporation, Hartford, CT (US)

(72) Inventor: Daniel A. Snyder, Manchester, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 339 days.

(21) Appl. No.: 14/852,856

(22) Filed: Sep. 14, 2015

(65) Prior Publication Data
US 2016/0194972 A1   Jul. 7, 2016

Related U.S. Application Data

(60) Provisional application No. 62/066,041, filed on Oct. 20, 2014.

(51) Int. Cl.
| F01D 11/00 | (2006.01) |
| F16J 15/06 | (2006.01) |
| F01D 5/10  | (2006.01) |

(52) U.S. Cl.
CPC .............. *F01D 11/006* (2013.01); *F01D 5/10* (2013.01); *F16J 15/064* (2013.01); *F05D 2220/32* (2013.01); *F05D 2240/55* (2013.01)

(58) Field of Classification Search
CPC ........ F01D 11/006; F01D 11/008; F01D 5/10; F01D 25/04; F01D 25/06; F16J 15/064; F05D 2220/32; F05D 2240/55
See application file for complete search history.

(56) References Cited

U.S. PATENT DOCUMENTS

| 5,161,949 A * | 11/1992 | Brioude ............... F01D 5/22 416/193 A |
| 5,460,489 A * | 10/1995 | Benjamin ............. F01D 5/22 416/248 |
| 5,573,375 A * | 11/1996 | Barcza ................. F01D 5/22 416/190 |
| 5,599,170 A * | 2/1997  | Marchi ................ F01D 5/22 416/190 |
| 5,827,047 A * | 10/1998 | Gonsor ................ F01D 5/22 416/193 A |
| 5,924,699 A * | 7/1999  | Airey .................. F01D 11/008 277/411 |
| 6,932,575 B2* | 8/2005  | Surace ................. F01D 5/22 416/193 A |
| 7,121,800 B2* | 10/2006 | Beattie ................ F01D 5/10 416/190 |
| 8,011,892 B2* | 9/2011  | Ramlogan ............ F01D 5/22 416/190 |
| 8,066,479 B2* | 11/2011 | El-Aini ............... F01D 11/008 416/1 |

(Continued)

*Primary Examiner* — Woody Lee, Jr.
*Assistant Examiner* — Adam W Brown
(74) *Attorney, Agent, or Firm* — Snell & Wilmer LLP

(57) ABSTRACT

A seal and damper system is provided. The system comprises a blade assembly seal with a central portion defining a recess and a depression. The system also includes a damper comprising a center body and an arm extending from the center body and configured to engage the depression. A blade assembly is also provided comprising a blade platform, a seal configured to press against the blade platform, and a damper clipped onto the seal.

19 Claims, 7 Drawing Sheets

(56) References Cited

U.S. PATENT DOCUMENTS

| | | | | |
|---|---|---|---|---|
| 8,672,626 | B2* | 3/2014 | Boy | F01D 5/26 |
| | | | | 416/1 |
| 9,863,257 | B2* | 1/2018 | Snyder | F01D 25/06 |
| 9,920,637 | B2* | 3/2018 | Snyder | F01D 5/22 |
| 2014/0112786 | A1* | 4/2014 | Donnell | F01D 5/22 |
| | | | | 416/140 |
| 2015/0330227 | A1* | 11/2015 | Propheter-Hinckley | F01D 5/16 |
| | | | | 416/106 |

* cited by examiner

SEAL AND CLIP-ON DAMPER SYSTEM AND DEVICE

CROSS-REFERENCE TO RELATED APPLICATIONS

This application is a nonprovisional of, and claims priority to, and the benefit of U.S. Provisional Application No. 62/066,041, entitled "SEAL AND CLIP-ON DAMPER SYSTEM AND DEVICE," filed on Oct. 20, 2014, which is hereby incorporated by reference in its entirety.

GOVERNMENT LICENSE RIGHTS

This disclosure was made with government support under contract No. FA8650-09-D-2923-0021 awarded by the United States Air Force. The government has certain rights in the disclosure.

FIELD OF INVENTION

The present disclosure relates to gas turbine engines, and, more specifically, to a seal and detachable damper for blades in a gas turbine engine.

BACKGROUND

Gas turbine engines may operate with turbulent air flow moving through the engine. Blades in the engine may be excited by the air flow and vibrate as a result. For example, turbine blades may be excited by the discrete jets of upstream nozzles (i.e., vanes) and may resonate as a result. The vibration incident to resonation may result in fatigue cracking Hooks and/or posts on a blade neck may attach blade-to-blade dampers that reduce vibrations. However, hooks and posts add mass and create stress concentrations in the blade assembly. Unnecessary mass on the blade assembly may result in an undesirably high centrifugal pull on the blade assembly.

SUMMARY

A seal and damper system is provided. The system comprises a blade assembly seal with a central portion defining a recess and a depression. The system also includes a damper comprising a center body and an arm extending from the center body and configured to engage the depression.

In various embodiments, the damper may also include a protrusion extending from the center body into the recess. The center body and the arm may define an opening. The opening may be configured to interface with the blade assembly seal. The center body may also include a planar surface with the protrusion extending from the planar surface and the arm breaking a plane of the planar surface. The damper may be configured to clip onto the blade seal assembly. The protrusion of the damper may slide relative to blade seal assembly with the range of sliding limited by the recess defined by the blade assembly seal.

A blade assembly is also provided comprising a blade platform, a seal configured to press against the blade platform, and a damper clipped onto the seal.

In various embodiments, the seal may further include a central portion, a first end extending away from the central portion and configured to contact the forward sidewall, and a second end extending away from the central portion and configured to contact the aft sidewall. A sidewall of the central portion may define a recess. The damper may further comprise a first protrusion configured to contact the sidewall of the central portion defining the recess. The damper may include a second protrusion with the seal between the first protrusion and the second protrusion. A width of the seal between the first protrusion and the second protrusion may be less than a distance between the first protrusion and the second protrusion. The seal may further include a depression configured to engage the damper. The damper may have a first arm configured to slideably engage the depression. The damper may also include a center body with the seal between the center body and the first arm. The damper may further have a second arm extending from the center body opposite the first arm.

A damper is also provided comprising a center body with a planar surface, at least one protrusion extending from the planar surface, and at least one arm extending from the center body. A portion of the arm extends substantially parallel to the center body. The damper may have a first arm and a second arm that break a plane of the planar surface. The damper may also comprise a first protrusion and a second protrusion that extend a substantially equal distance from the planar surface.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
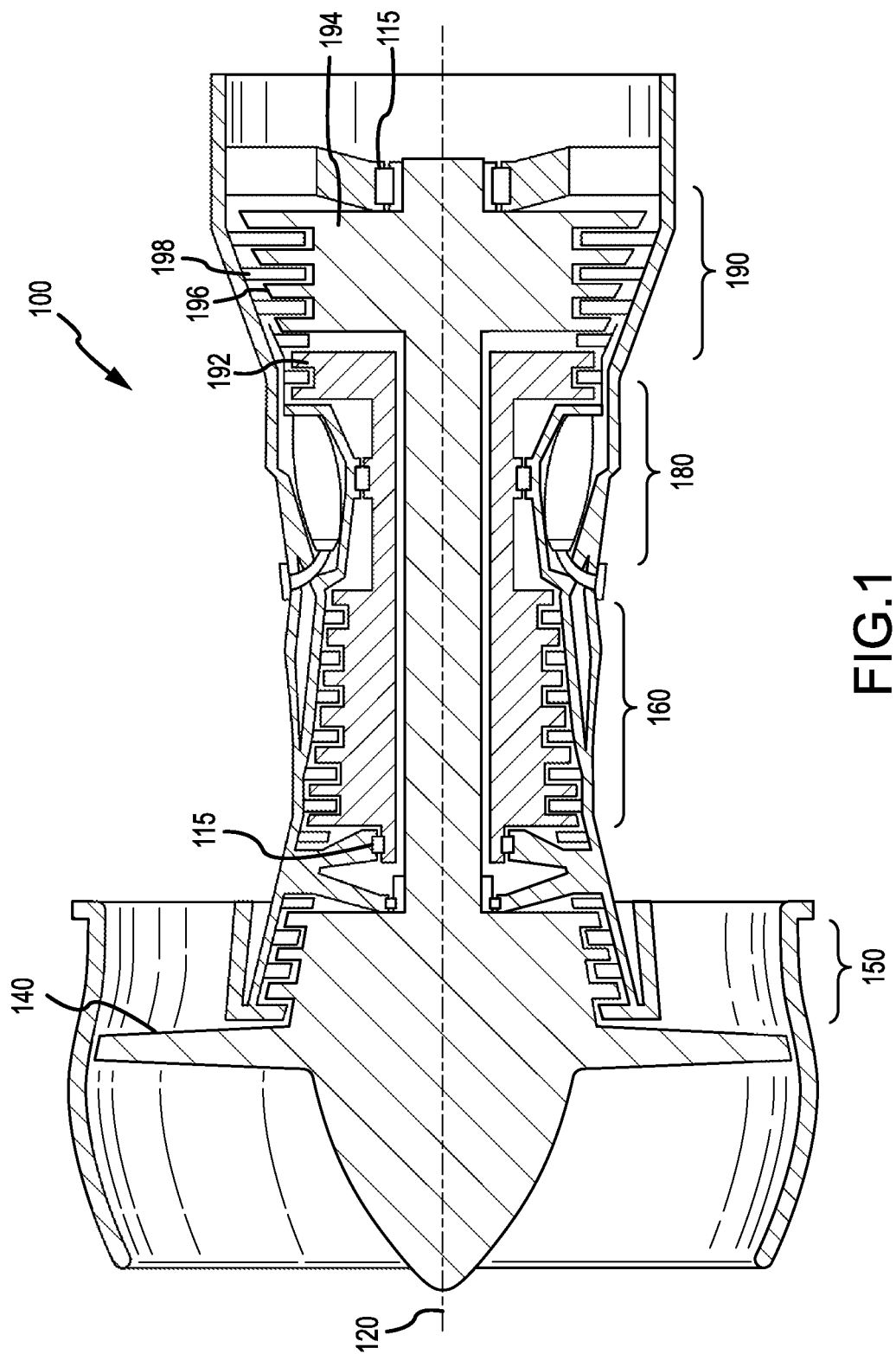
FIG. 1 illustrates a cross-sectional view of an exemplary gas turbine engine, in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. A plurality of bearings 115 may support spools in the gas turbine engine 100. Gas turbine engine 100 may comprise a fan 140, compressor sections 150 and 160, a combustion section 180, and a turbine section 190. Air compressed in compressor sections 150, 160 may be mixed with fuel and burned in combustion section 180 and expanded across turbine section 190. Turbine section 190 may include high-pressure rotors 192 and low-pressure rotors 194, which rotate in response to the expansion. Turbine section 190 may comprise alternating rows of rotary airfoils or blades 196 and static airfoils or vanes 198. Air flowing through, for example, the rows of blades 196 and vanes 198, may cause vibration. A damper may be used to reduce such vibration. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
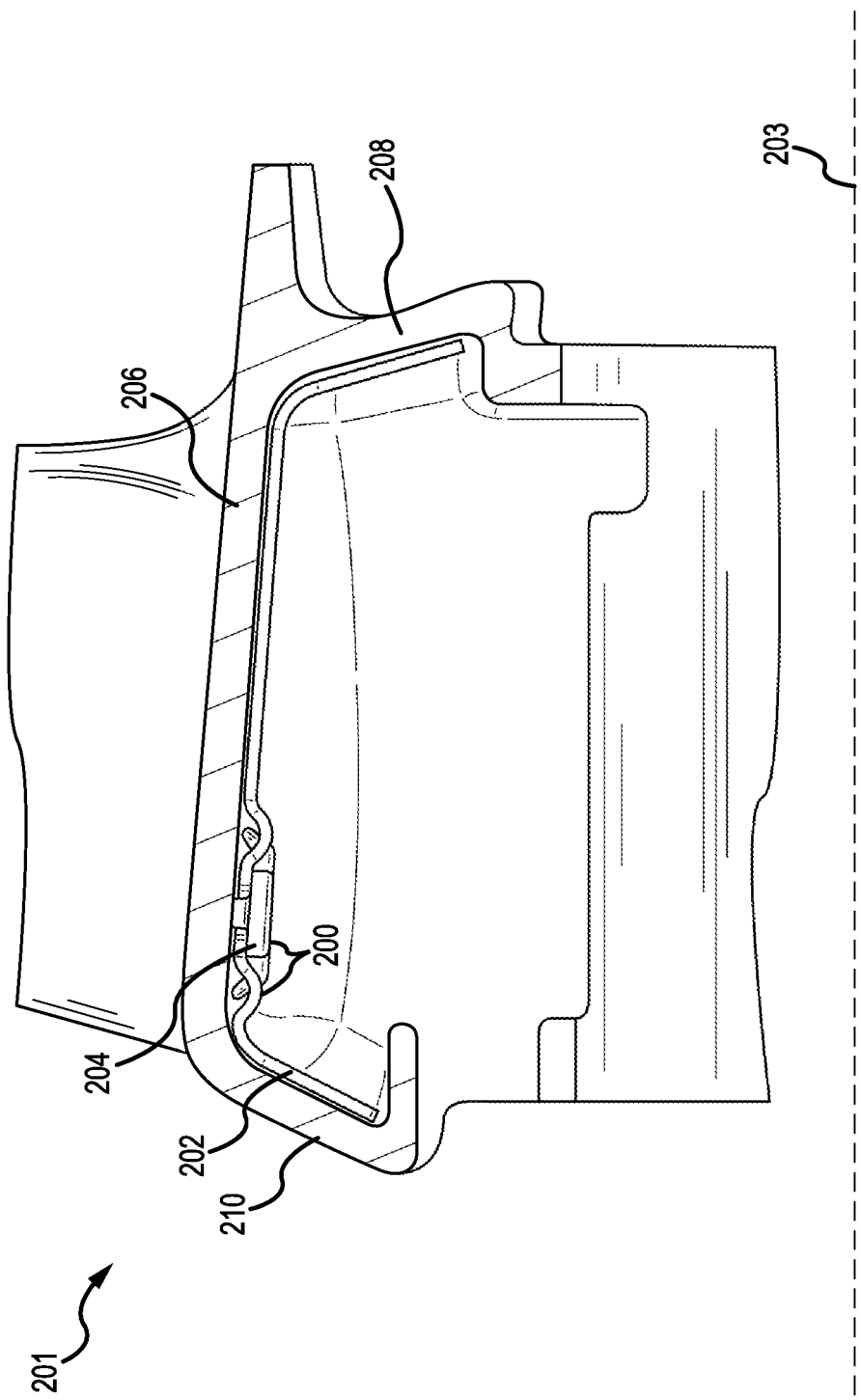
FIG. 2 illustrates a seal and detachable friction damper installed in a blade, in accordance with various embodiments.

In various embodiments, and with reference to FIG. 2, seal and detachable (e.g., clip-on) damper system 200 is shown installed on a blade assembly 201. Blade assembly 201 comprises blade platform 206. A blade (e.g., a turbine blade or compressor blade) may rest on blade platform 206. Blade platform 206 may have forward sidewall 210 and aft sidewall 208. Seal 202 may lay flat and press against forward sidewall 210. Seal 202 may extend continuously across blade platform 206 and press against blade platform 206 to seal the mateface gap between blade platform 206 and adjacent blade platforms. A portion of seal 202 may also lay flat and press against aft sidewall 208. During operation, an inertial force of seal 202 (e.g., the momentum and resistance to change in the direction of seal 202) may force seal 202 radially outward against blade platform 206 in response to the rotation of blade assembly 201 about axis 203.

In various embodiments, damper 204 (the structure and installation of which is further discussed below with respect to FIGS. 3-7) may be clipped on seal 202 and may press against blade platform 206. Similar to inertial forces of seal 202, during operation an inertial force of damper 204 may force damper 204 against blade platform 206 in response to the rotation of blade assembly 201 about axis 203.

In various embodiments, damper 204 may have a mass calibrated to provide the desired damping effect on various blades in different sized gas turbine engines. The mass of damper 204 may be calibrated based on a desired centrifugal force. For example, a centrifugal force of 50 lbf (222 N) to 150 lbf (667 N) may be desired. In that regard, damper 204 may have a mass from 0.0007 lbs (317 mg) to 0.0021 lbs (953 mg) to achieve the desired centrifugal force over the operating rpm range of an engine. In various embodiments, damper 204 may have a mass up to 0.0086 lbs (3.9 g) to achieve a centrifugal force of up to 600 lbf (2669 N). For example, sections of a gas turbine engine may rotate at an angular velocity of 15,000 RPM. The centrifugal force on the damper may be represented as $F=mr\omega^2$, where centrifugal force is F, the mass of damper 204 is m, the radius from the axis 203 of rotation to damper 204 is r, and the angular velocity (i.e., rotational speed) of damper 204 is $\omega$. Damper 204 used in an engine having a large radius and/or high revolution speed may utilize a smaller mass to achieve a desired centrifugal force. Similarly, damper 204 for use in an engine having a small radius and/or lower rotational speed needs a larger mass to achieve the same desired centrifugal force.

In various embodiments, kinetic friction between damper 204 and blade platform 206 tends to provide damping for a blade on blade platform 206. The normal load at protrusions 304 (i.e., centripetal pull of the damper) may be calibrated to allow damper 204 to slip as blade platform 206 vibrates and result in kinetic friction. Seal and detachable damper system 200 may be constrained radially by blade platform 206. During operation, seal and detachable damper system 200 may press against the underside of blade platform 206. Damper 204 and/or seal 202 may slide in a tangential direction to dampen blade vibration. Damper 204 and/or seal 202 may also have an axial or radial motion against blade platform 206 to provide additional damping. Seal 202, damper 204, and blade platform 206 may all move relative to one another. In particular, seal 202 and damper 204 may move independently of one another and act as independent dampers.

In various embodiments, damper 204 and seal 202 may be made from a high-performance nickel based superalloy (e.g., various alloys available under the trade name INCONEL). Damper 204 and seal 202 may also be made from a cobalt alloy or other material suitable to high temperature applications. Seal 202 may be cut from a sheet of the desired material and formed into the desired shape. In accordance with various embodiments, damper 204 may be cast or additively manufactured into a clip shape. A clip shape may be any shape enabling damper 204 to slideably engage seal 202 and retain damper 204 on seal 202 without requiring external fasteners.

Figure 3:
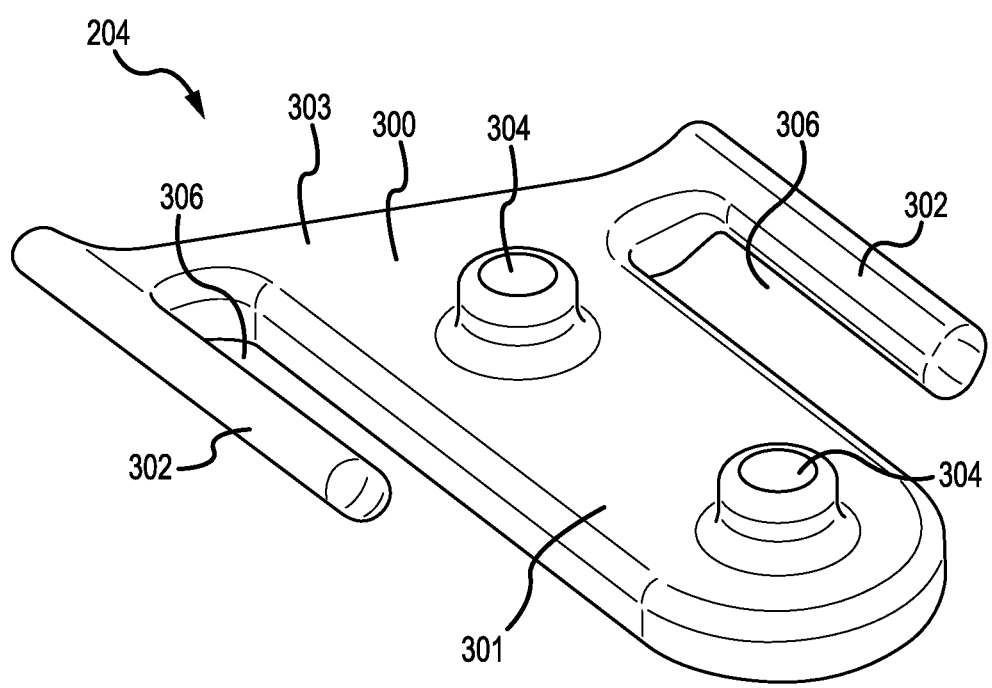
FIG. 3 illustrates a perspective view of a clip-on damper, in accordance with various embodiments.
Figure 4:
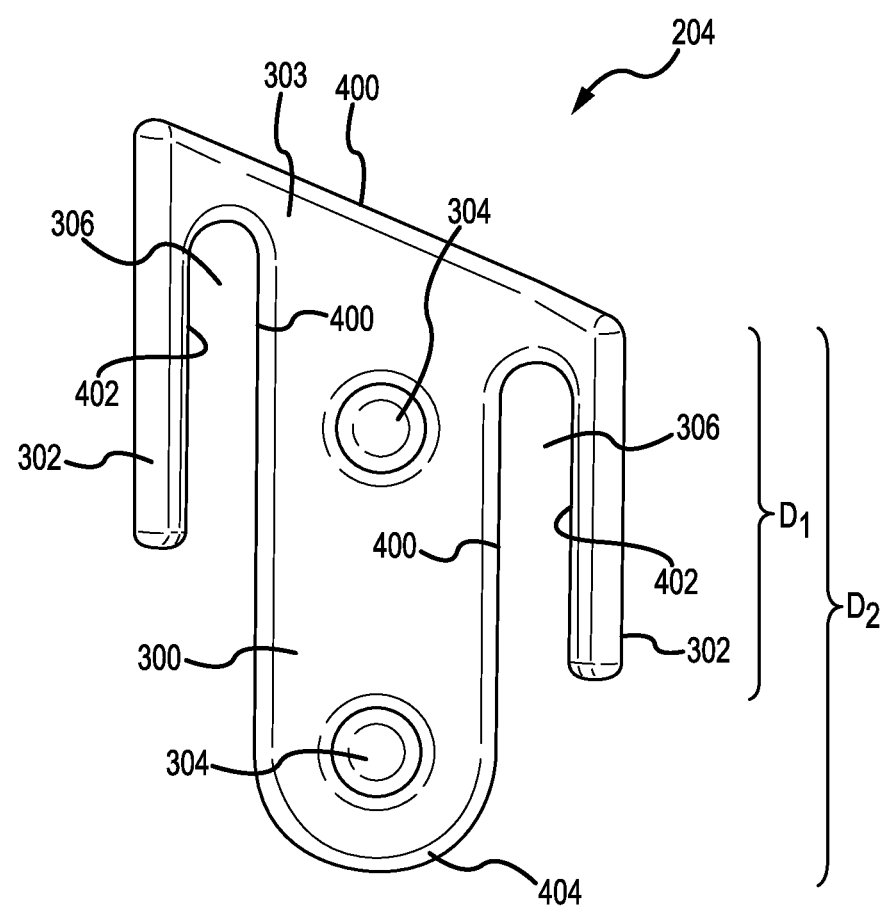
FIG. 4 illustrates a top view of a clip-on damper, in accordance with various embodiments.

Referring to FIGS. 3 and 4, damper 204 is shown in accordance with various embodiments of the present disclosure. Damper 204 includes a center body 300. Center body 300 may be flat and elongated. Center body may have arms 302 attached at an end 303 of center body 300 and extending parallel to center body 300 on opposite sides of center body 300. As shown in FIG. 4, the distance $D_1$ that arms 302 extend from angled surface 400 may be less than the distance $D_2$ that center body 300 extends from angled surface 400. Center body 300 may extend away from angled surface 400 at an angle that is not ninety degrees. Arms 302 adjacent center body 300 may define opening 306 that interfaces with seal 202 to provide space for damper 204 to clip to seal 202. In that regard, a portion of seal 202 may be received in opening 306 between center body 300 and inner side 402 of arm 302 to clip damper 204 onto seal 202.

Figure 5:
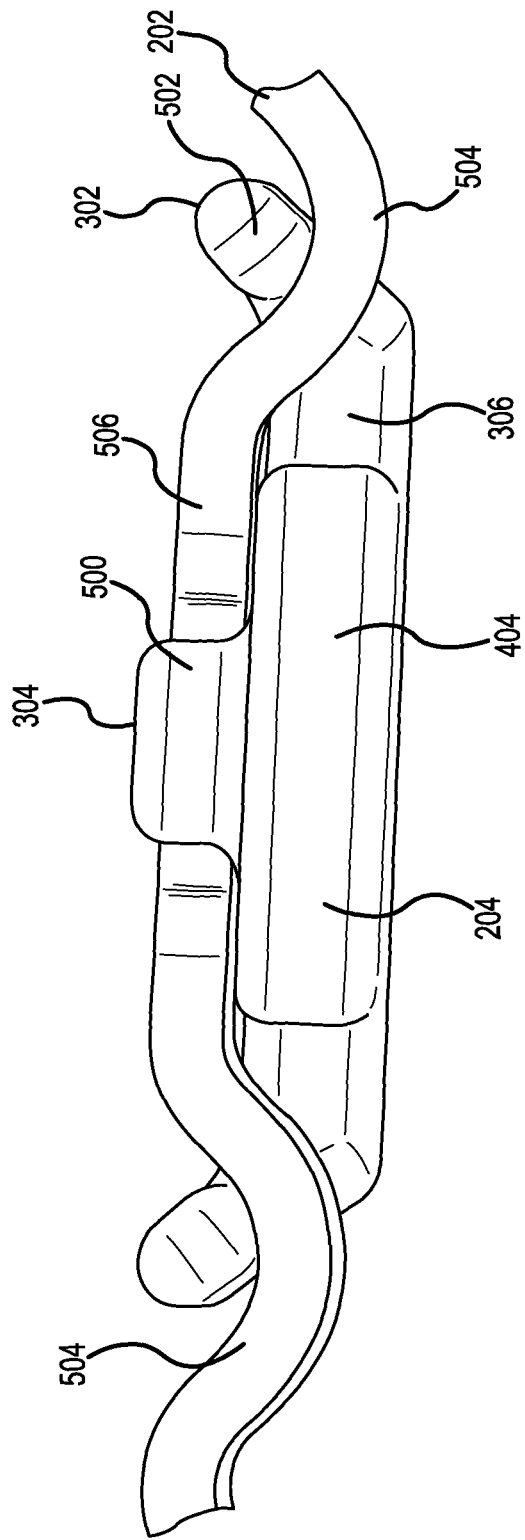
FIG. 5 illustrates a partial elevation view of a seal with a damper clipped onto the seal, in accordance with various embodiments.

In various embodiments, damper 204 may include protrusions 304 extending from a substantially planar surface 301 of center body 300. Protrusions 304 may be circular, square, rectangular, or irregularly shaped. Protrusions 304 provide a standoff height from blade assembly 201 of FIG. 2 when installed and press against blade platform 206 during engine operation. In various embodiments, each protrusion may extend substantially the same distance from center body 300. Center body 300 may have a substantially planar surface 301 with arms 302 and protrusions 304 both non-coplanar with center body 300, as shown in FIG. 3. Protrusions 304 may extend away from substantially planar surface 301 in a direction orthogonal to substantially planar surface 301. Substantially planar surface 301 may define a plane with arms 302 extending to the same side of the plane as protrusions 304. Center body 300 may have a leading edge 404 configured to slide smoothly against seal 202 during installation of damper 204 on seal 202, as shown in FIGS. 4 and 5. Leading edge 404 may be rounded, squared, triangular, or irregularly shaped.

Figure 6:
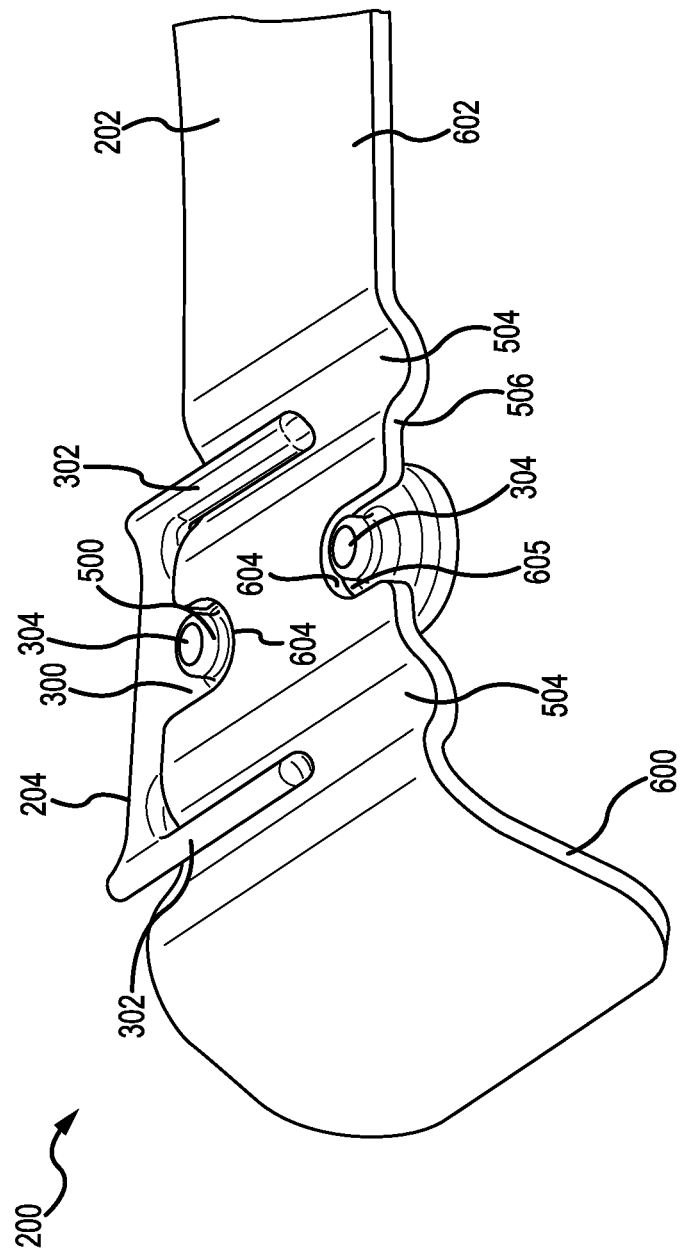
FIG. 6 illustrates a perspective view of a seal with a damper clipped onto the seal, in accordance with various embodiments.
Figure 7:
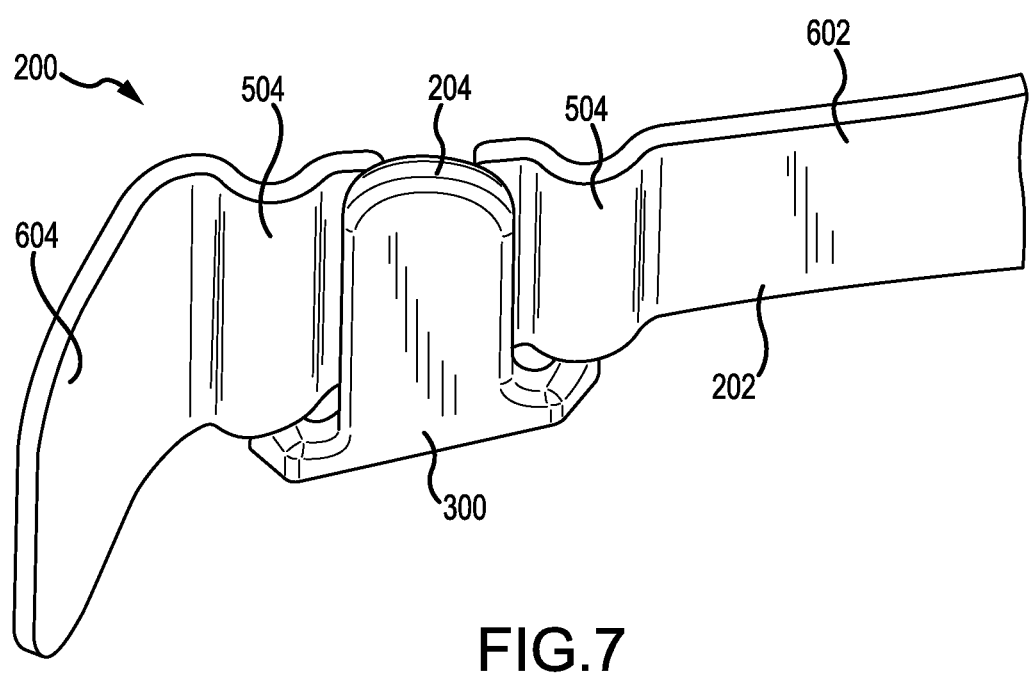
FIG. 7 illustrates a bottom view of a seal with a damper clipped onto the seal, in accordance with various embodiments.

Referring to FIGS. 5-7 damper 204 is clipped on seal 202 in accordance with various embodiments. Damper 204 may have arms 302 extending at an angle from the plane defined by substantially planar surface 301 of center body 300. Protrusions 304 may extend to the same side of the plane defined by substantially planar surface 301. Seal 202 may define depression 504 where seal 202 may bend away from blade platform 206 of FIG. 2. Arms 302 of damper 204 may slideably engage depressions 504 of seal 202 with a portion of seal 202 disposed in opening 306 of damper 204. Surface 502 of arms 302 may be exposed from seal 202 in a tangential or circumferential direction such that arms 302 may be unconstrained by seal 202 from sliding in the circumferential direction. Surface 500 of protrusion 304 may face away from seal 202 so surface 500 does not contact seal 202. Leading edge 404 of center body 300 may be exposed from seal 202 in a tangential or circumferential direction so leading edge 404 does not contact seal 202 when damper 204 is clipped onto seal 202. Protrusion 304 may extend from center body 300 and protrude from seal 202 disposed over center body 300. In that regard, protrusion 304 may extend further from center body 300 than sidewall 506 of seal 202 extends above center body.

Seal 202 may have end 600 that presses against forward sidewall 210 or aft sidewall 208, as shown in FIG. 6. End 600 of seal 202 may further bend away from central portion 602 of seal 202 so that end 600 may form an angle with central portion 602 of seal 202. Central portion 602 of seal 202 may be elongated to span the axial length of blade platform 206. In various embodiments, seal 202 may be approximately 1.5 inches (3.8 cm) from end to end. Damper 204 may be approximately a quarter inch (0.6 cm) from arm 302 to arm 302. Damper may also measure approximately half inch (1.3 cm) from angled surface 400 to leading edge 404. Sizes for seal and damper may vary based on the application.

In various embodiments, seal 202 may define recesses 604 in sidewall 506 of seal 202. Recesses 604 may be shaped to accept protrusions 304 of damper 204. A gap 605 may separate seal 202 from protrusions 304 of damper 204 when damper 204 is clipped on to seal 202. Gap 605 may allow damper 204 to move circumferentially or tangentially during engine operation to slideably engage blade platform 206 (as shown in FIG. 2). Thus, protrusions 304 of damper 204 may fit loosely into recesses 604 so that the distance across the portion of seal 202 between protrusions 304 is less than the distance between protrusions 304. For example, protrusions 304 may have 0.01 inches (0.3 mm) to 0.05 inches (1.3 mm) to move in a circumferential direction relative to recesses 604 of seal 202. Recesses 604 may be the limiting factor in how far damper 204 can slide in a circumferential direction as protrusions 304 may contact sidewall 506 of seal 202 defining recesses 604.

In various embodiments, damper 204 may be configured to clip to seal 202 as shown in FIG. 2. Seal 202 may be configured to allow damper 204 to slide in a tangential or circumferential direction during engine operation. Damper 204 may have any shape capable of clipping onto seal 202 and being retained on seal 202 without requiring external fasteners. For example, damper 204 may slide onto seal 202 in a circumferential direction with arms 302 bending away from center body 300. Arms 302 and center body 300 may elastically return to the starting position to press against seal 202 and retain damper 204 on seal 202. Seal 202 may be formed with depressions and openings in seal 202 to allow damper 204 to clip onto seal 202 and retain damper 204 on seal 202 in response to damper 204 sliding circumferentially to dampen vibrations. In that regard, damper 204 clipped on to seal 202 may provide damping with reduced mass on blade assembly 201 by enabling seal 202, damper 204, and blade platform 206 to move independently. Thus, the seal with detachable damper system 200 minimizes centrifugal force of blade assembly 201 while damping vibrations from resonation of blade assembly 201.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal and damper system, comprising:
    a blade assembly seal having a length and a width, the length being parallel to an axis of rotation, the blade assembly seal comprising a central portion defining a recess and a depression, the depression spanning the width of the blade assembly seal, the depression being convex towards the axis of rotation; and
    a damper comprising:
        a center body; and
        an arm extending from the center body parallel to the width, the arm being configured to engage the depression.

2. The seal and damper system of claim 1, wherein the damper further comprises a protrusion extending from the center body into the recess.

3. The seal and damper system of claim 2, wherein the center body and the min define an opening.

4. The seal and damper system of claim 3, wherein the opening is configured to interface with the blade assembly seal.

5. The seal and damper system of claim 2, wherein the center body comprises a planar surface with the protrusion extending from the planar surface and the arm breaking a plane defined by the planar surface.

6. The seal and damper system of claim 2, wherein the protrusion of the damper is configured to slide relative to the blade assembly seal with a range of sliding limited by the recess defined by the blade assembly seal.

7. The seal and damper system of claim 1, wherein the damper is configured to clip onto the blade assembly seal.

8. A blade assembly, comprising:
    a blade platform having an axis of rotation;
    a seal configured to press against the blade platform, the seal having a length and a width, the length being parallel to the axis of rotation of the blade platform, the seal comprising a central portion defining at least two depressions spanning the width of the seal; and
    a damper clipped onto the seal in a direction parallel to the width of the seal.

9. The blade assembly of claim 8, wherein the seal further comprises:
    a first end extending away from the central portion and configured to contact a forward sidewall of the blade platform; and
    a second end extending away from the central portion and configured to contact an aft sidewall of the blade platform.

10. The blade assembly of claim 9, wherein a sidewall of the central portion defines a recess.

11. The blade assembly of claim 10, wherein the damper further comprises a first protrusion configured to contact the sidewall of the central portion defining the recess.

12. The blade assembly of claim 11, wherein the damper further comprises a second protrusion with the seal between the first protrusion and the second protrusion.

13. The blade assembly of claim 12, wherein a width of the seal between the first protrusion and the second protrusion is less than a distance between the first protrusion and the second protrusion.

14. The blade assembly of claim 8, wherein the damper further includes a first arm configured to slideably engage the depression.

15. The blade assembly of claim 14, wherein the damper further includes a center body with the seal between the center body and the first arm.

16. The blade assembly of claim 15, wherein the damper further comprises a second arm extending from the center body opposite the first arm.

17. A damper for a seal, the seal having a length and a width, the damper comprising:
    a center body comprising a planar surface;
    at least one protrusion extending from the planar surface and perpendicular to the planar surface; and
    at least one arm extending from the center body with a portion thereof extending substantially parallel to the width of the seal, the at least one arm configured to engage a depression on the seal, the depression being convex to the planar surface.

18. The damper of claim 17, wherein the at least one arm includes a first arm and a second arm that break a plane of the planar surface.

19. The damper of claim 17, wherein the at least one protrusion includes a first protrusion and a second protrusion that extend a substantially equal distance from the planar surface.

* * * * *